(12) United States Patent
Li et al.

(10) Patent No.: US 12,538,280 B2
(45) Date of Patent: Jan. 27, 2026

(54) SPATIAL REUSE METHOD AND DEVICE

(71) Applicant: ZTE Corporation, Guangdong (CN)

(72) Inventors: Ruimei Li, Guangdong (CN); Kaiying Lv, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

(21) Appl. No.: 16/457,577

(22) Filed: Jun. 28, 2019

(65) Prior Publication Data

US 2019/0327741 A1 Oct. 24, 2019

Related U.S. Application Data

(63) Continuation of application No. PCT/CN2017/114213, filed on Dec. 1, 2017.

(30) Foreign Application Priority Data

Dec. 30, 2016 (CN) .......................... 201611260102.2
Jan. 6, 2017 (CN) .......................... 201710015576.9

(51) Int. Cl.
*H04W 72/12* (2023.01)
*H04W 72/0453* (2023.01)
*H04W 84/12* (2009.01)

(52) U.S. Cl.
CPC ........ *H04W 72/0453* (2013.01); *H04W 84/12* (2013.01)

(58) Field of Classification Search
CPC ........... H04W 72/0453; H04W 74/002; H04W 74/0808; H04W 84/12
See application file for complete search history.

(56) References Cited

U.S. PATENT DOCUMENTS

2016/0157195 A1* 6/2016 Wang .................. H04W 56/001
 370/350
2016/0174254 A1 6/2016 Hedayat
(Continued)

FOREIGN PATENT DOCUMENTS

CN 104284441 A 1/2015
CN 104954297 A 9/2015
(Continued)

OTHER PUBLICATIONS

"IEEE 802.11 Medium Access Control (MAC), Clear Channel Assessment", Vrancken et al., (Year: 2004).*
(Continued)

*Primary Examiner* — Marcus Smith
*Assistant Examiner* — Zhaohui Yang
(74) *Attorney, Agent, or Firm* — Foley & Lardner LLP

(57) ABSTRACT

Provided are a spatial reuse method and apparatus. The method includes: receiving a radio frame and determining whether the radio frame carries a trigger frame configured to trigger uplink multi-user transmission according to indication information of the trigger frame in a physical signaling field of the radio frame; when the trigger frame is determined to be carried in the radio frame, receiving, by a station, the trigger frame, and acquiring first spatial reuse information of the trigger frame; at an end of a radio frame reception process, determining whether to perform first spatial reuse according to the first spatial reuse information. The present disclosure solves the problem in the related art of low spatial reuse efficiency when a station performs spatial reuse on a radio frame and achieves a technical effect of improving network performance.

10 Claims, 4 Drawing Sheets

(56) References Cited

U.S. PATENT DOCUMENTS

| | | | |
|---|---|---|---|
| 2016/0174262 A1* | 6/2016 | Xing | H04W 16/28 370/329 |
| 2016/0315675 A1* | 10/2016 | Seok | H04L 1/1854 |
| 2017/0070962 A1* | 3/2017 | Wang | H04W 52/247 |
| 2017/0118725 A1* | 4/2017 | Chu | H04W 72/0446 |
| 2017/0188368 A1* | 6/2017 | Cariou | H04L 61/6022 |
| 2017/0188376 A1* | 6/2017 | Noh | H04W 52/42 |
| 2017/0230837 A1* | 8/2017 | Huang | H04B 7/0452 |
| 2017/0311329 A1* | 10/2017 | Barriac | H04W 74/0808 |
| 2018/0007661 A1 | 1/2018 | Chun et al. | |
| 2018/0077654 A1* | 3/2018 | Kulkarni | H04W 74/0816 |

FOREIGN PATENT DOCUMENTS

| | | | |
|---|---|---|---|
| CN | 104995949 A | 10/2015 | |
| CN | 106060942 A | 10/2016 | |
| WO | WO-2016/028125 A2 | 2/2016 | |
| WO | WO-2016/099139 A1 | 6/2016 | |
| WO | WO-2017078442 A1 * | 5/2017 | H04B 17/318 |

OTHER PUBLICATIONS

Extended European Search Report on EP 17888098.5 dated Jan. 17, 2020 (8 pages).

Matthew Fischer (Broadcom), "CR-for section-25-9-spatial-reuse-operation-for-HE-PPDU," IEEE 802.11-16/1476r1, vol. 802.11, No. 1, Nov. 7, 2016 (6 pages).

International Search Report and Written Opinion for International Appl. No. PCT/CN2017/114213, mailed on Mar. 5, 2018.

Extended European Search Report for EP Appl. No. 17888098.5 dated Mar. 4, 2021 (8 pages).

Huang et al.: "11ax D0.5 Spec Texts: Spatial Reuse Indication for Trigger" IEEE 802.11-16/1121r2; Aug. 29, 2016; NJ, USA (4 pages).

Huang et al.: "Consideration of Spatial Reuse for Trigger Frame" IEEE 802.11-16/0647R0; May 16, 2016; NJ, USA (21 pages).

European Search Report for EP Appl. No. 17888098.5, dated Mar. 3, 2022 (7 pages).

* cited by examiner

SPATIAL REUSE METHOD AND DEVICE

CROSS-REFERENCE TO RELATED APPLICATIONS

This application claims the benefit of priority under 35 U.S.C. § 120 as a continuation of PCT Patent Application No. PCT/CN2017/114213 filed on Dec. 1, 2017, which claims priority to Chinese Patent Application No. 201710015576.9, filed on Jan. 6, 2017, and to Chinese Patent Application No. 201611260102.2, filed on Dec. 30, 2016, each of which is incorporated by reference herein in its entirety.

TECHNICAL FIELD

The present disclosure relates to the field of communications and, exemplarily, to a spatial reuse method and apparatus.

BACKGROUND

In an infrastructure network of a wireless local area network (WLAN), a basic service set (BSS) is composed of an access point (AP) station and multiple non-AP stations (non-AP STAs) associated with the AP. In the WLAN, whether a channel is occupied is generally determined through carrier detection techniques, which may include at least one of physical carrier detection and virtual carrier detection. In physical carrier detection, a radio channel is monitored to determine whether the received energy exceeds a certain threshold. The channel is considered occupied in response to the energy exceeding the threshold. In virtual carrier detection, the sender and receiver transmit a radio frame which carries channel time to be reserved for the subsequent transmission, and other stations locally maintain one or more timers such as network allocation vectors (NAVs) according to the received reservation time and do not contend for the channel if the NAVs of the stations are not 0. In a related art, the spatial reuse (SR) technology has been extensively explored because the SR technology can improve performance in dense scenarios. The core of the SR is that a station performs transmission while an overlapping basic service set (OBSS) performs transmission, thereby improving spectrum efficiency and network performance. To reduce the interference caused by simultaneous transmission, the SR is combined with a power adjustment technology, which may be referred to as transmission power control (TPC). Two types of SR technology are respectively based on the signal strength of the received radio frame, and a degree of interference on the receiver when the received radio frame is exchanged.

When it is determined that the channel cannot be reused based on the signal strength of the currently received radio frame (as the NAV may have been set), the interference on the receiver cannot be utilized for subsequence reuse determination. Thus, performing multiplexed transmission jointly using the two reuse determination manners has not been entirely satisfactory.

SUMMARY

Embodiments of the present disclosure provides a spatial reuse method and apparatus, to solve at least the problem in the related art of low spatial reuse efficiency when a station performs spatial reuse on a radio frame and achieve a technical effect of improving network performance.

An embodiment of the present disclosure provides a spatial reuse method, which is applied to a station in a WLAN. The method includes receiving a radio frame and determining whether the radio frame carries a trigger frame configured to trigger uplink multi-user transmission according to indication information of the trigger frame in a physical signaling field of the radio frame. In response to determining that the radio frame carries the trigger frame, the method includes receiving, by the station, the trigger frame and acquiring first spatial reuse information of the trigger frame. At an end of the radio frame, the method includes determining whether to perform first spatial reuse according to the first spatial reuse information.

In some embodiments, the method further includes obtaining the indication information of the trigger frame according to second spatial reuse information in the physical signaling field of the radio frame.

In some embodiments, the method further includes when the second spatial reuse information indicates that spatial reuse is delayed to the end of the radio frame, determining a detection result to be that the radio frame carries the trigger frame. Or, when the second spatial reuse information indicates that spatial reuse time is restricted before the end of the radio frame, the method further includes determining the detection result to be that the radio frame carries the trigger frame.

In some embodiments, before the first spatial reuse information is acquired, the method further includes identifying, according to basic service set identification information of the radio frame, that the radio frame belongs to an overlapping basic service set.

In some embodiments, before the first spatial reuse information is acquired, the method further includes that when a received signal strength indicator of the radio frame is greater than or equal to a signal detection threshold of the overlapping basic service set of the station, the station receives the trigger frame to obtain the first spatial reuse information.

In some embodiments, performing the first spatial reuse according to the first spatial reuse information at the end of the radio frame includes: starting or resuming a back-off contention process at the end of the radio frame.

In some embodiments, the method further includes at an end of the back-off contention process, starting a frame exchange transmission process. A duration of the frame exchange transmission process is not greater than reservation time of the radio frame or a length of uplink radio frame transmission time indicated by the trigger frame.

In some embodiments, the method further includes at an end of the back-off contention process, starting a frame exchange transmission process. Transmission power TX_PWR of the station in the frame exchange transmission process is not greater than TX_PWR1, where TX_PWR1 is a difference obtained by subtracting a received signal strength indicator (RSSI) of the radio frame from SRP indicated by the first spatial reuse information.

In some embodiments, in a case or condition that no trigger frame is carried in the radio frame, or the first spatial reuse information indicates that the spatial reuse is not allowed, the method further includes when a second spatial reuse condition is not satisfied, updating a local network allocation vector or the length of the uplink radio frame transmission time indicated by the trigger frame according to the reservation time of the radio frame at the end of the radio frame.

In some embodiments, when the received signal strength indicator of the radio frame is greater than or equal to the signal detection threshold of the overlapping basic service set of the station, it is determined that the second spatial reuse condition is not satisfied.

In some embodiments, the method further includes determining, according to the first spatial reuse information, whether a first spatial reuse condition is satisfied. If both the first spatial reuse condition and the second spatial reuse condition are satisfied, the method further includes ignoring updating of the local network allocation vector. If the first spatial reuse condition is satisfied and the second spatial reuse condition is not satisfied, the method further includes ignoring the updating of the local network allocation vector. If both the first spatial reuse condition and the second spatial reuse condition are not satisfied, the method further includes updating the local network allocation vector.

In some embodiments, when the second spatial reuse information indicates that the spatial reuse is delayed to the end of the radio frame, the method further includes when the received signal strength indicator of the radio frame is less than the signal detection threshold of the overlapping basic service set of the station, determining that the second spatial reuse condition is satisfied and receiving the trigger frame to obtain the first spatial reuse information.

In some embodiments, performing the spatial reuse according to the first spatial reuse information at the end of the radio frame includes: starting or resuming a back-off contention process at the end of the radio frame and starting a frame exchange transmission process at the end of the back-off contention process. A duration of the frame exchange transmission process is not greater than reservation time of the radio frame; and transmission power TX_PWR in the frame exchange transmission process is not greater than a minimum value between TX_PWR1 and TX_PWR2, where TX_PWR1 is a difference obtained by subtracting the received signal strength indicator (RSSI) of the radio frame from SRP indicated by the first spatial reuse information, and TX_PWR2 is maximum transmission power corresponding to the signal detection threshold of the overlapping basic service set of the station.

In some embodiments, when the second spatial reuse information indicates that the spatial reuse time is restricted to the end of the radio frame, the method further includes when the received signal strength indicator of the radio frame is less than the signal detection threshold of the overlapping basic service set of the station, determining that the second spatial reuse condition is satisfied.

In some embodiments, the method further includes stopping detecting the radio frame, and stopping receiving the trigger frame carried in the radio frame. The method further includes starting or resuming a back-off contention process, and starting a frame exchange transmission process at the end of the back-off contention process, in some embodiments. A duration of the frame exchange transmission process is not greater than ending time of the radio frame, and transmission power TX_PWR of the station in the frame exchange transmission process is not greater than TX_PWR2, where TX_PWR2 is maximum transmission power corresponding to the signal detection threshold of the overlapping basic service set of the station.

In some embodiments, the station starts or resumes the back-off competition process, and the method further includes starting or resuming the back-off competition process when channel detection of the station indicates that a channel is idle.

An embodiment of the present disclosure provides another spatial reuse method, which is applied to a station in a WLAN. The method includes transmitting a radio frame, where physical layer signaling of the radio frame includes indication information for indicating whether the radio frame is a trigger frame.

In some embodiments, the trigger frame is configured to trigger uplink transmission.

In some embodiments, transmitting the radio frame includes at least one of: transmitting the radio frame in a single user frame format, transmitting the radio frame in an extended range single user frame format, or transmitting the radio frame in a multi-user frame format.

In some embodiments, the indication information is carried in a common signaling field in the physical layer signaling of the radio frame.

In some embodiments, the indication information is represented by a specific value of a spatial reuse parameter information field in a common signaling field in the physical layer signaling of the radio frame. When the specific value indicates that spatial reuse is delayed to an end of the radio frame or spatial reuse time is restricted to the end of the radio frame, the specific value simultaneously indicates that the radio frame is the trigger frame.

In some embodiments, the indication information is carried in a trigger frame indication field in a common signaling field in the physical layer signaling of the radio frame.

In some embodiments, the trigger frame indication field is 1 or true, indicating that the radio frame carries the trigger frame. The trigger frame indication field is 0 or false, indicating that the radio frame carries no trigger frame.

In some embodiments, the trigger frame indication field occupies a number N of bits, where $N \geq 1$.

Another embodiment of the present disclosure provides a spatial reuse apparatus, which is applied to a station in a WLAN. The apparatus includes a detection module, a processing module and a reuse module. The detection module is configured to receive a radio frame and determine whether the radio frame carries a trigger frame configured to trigger uplink multi-user transmission according to indication information of the trigger frame in a physical signaling field of the radio frame. The process module is configured to enable the station to receive the trigger frame and acquire first spatial reuse information of the trigger frame when it is determined that the radio frame carries the trigger frame. The reuse module is configured to determine whether to perform first spatial reuse according to the first spatial reuse information at an end of the radio frame.

In some embodiments, the apparatus further includes an acquisition module. The acquisition module is configured to acquire the indication information of the trigger frame according to second spatial reuse information in the physical signaling field of the radio frame.

In some embodiments, the apparatus further includes a first determination module and a second determination module. The first determination module is configured to determine a detection result to be that the radio frame carries the trigger frame when the second spatial reuse information indicates that spatial reuse is delayed to the end of the radio frame. The second determination module is configured to determine the detection result to be that the radio frame carries the trigger frame when the second spatial reuse information indicates that spatial reuse time is restricted before the end of the radio frame.

In some embodiments, the reuse module further includes a first reuse unit. The first reuse unit is configured to start or resume a back-off contention process at the end of the radio frame.

Another embodiment of the present disclosure provides another spatial reuse apparatus, which is applied to a station in a WLAN. The apparatus includes a transmitting module configured to transmit a trigger frame of a radio frame. Physical layer signaling of the radio frame includes indication information for indicating whether the radio frame is the trigger frame.

In the present disclosure, the radio frame is received and whether the radio frame carries the trigger frame configured to trigger the uplink multi-user transmission according to the indication information of the trigger frame in the physical signaling field of the radio frame; when it is determined that the radio frame carries the trigger frame, the station receives the trigger frame and acquires the first spatial reuse information of the trigger frame; at the end of the radio frame, whether to perform the first spatial reuse is determined according to the first spatial reuse information. Since spatial reuse on a subsequent radio frame is determined with the trigger frame, the problem in the related art of low spatial reuse efficiency when a station performs spatial reuse on a radio frame is solved and a technical effect of improving network performance is achieved.

BRIEF DESCRIPTION OF DRAWINGS

The drawings described herein are used to provide an understanding of the present disclosure, and form a part of the present application. The exemplary embodiments and descriptions thereof in the present disclosure are used to explain the present disclosure and do not limit the present disclosure.

DETAILED DESCRIPTION

The present disclosure will be described hereinafter in detail with reference to the drawings and in conjunction with embodiments. It is to be noted that if not in collision, the embodiments and features therein in the present application may be combined with each other.

It is to be noted that the terms "first", "second" and the like in the description, claims and above drawings of the present disclosure are used to distinguish between similar objects and are not necessarily used to describe a particular order or sequence.

Embodiment 1

Figure 1:
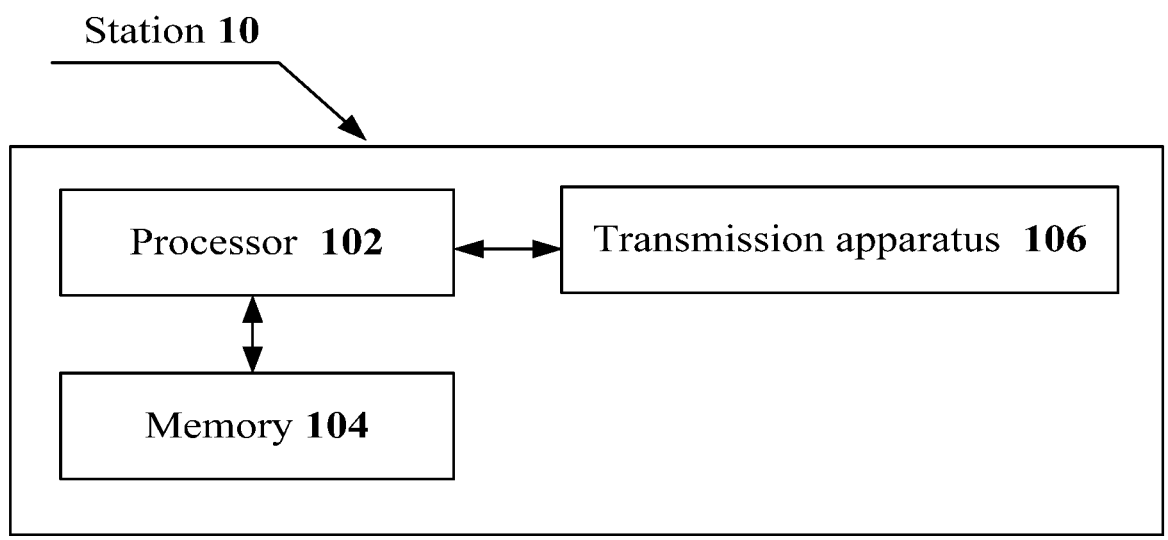
FIG. 1 is a block diagram of hardware of a station for a spatial reuse method according to an embodiment of the present disclosure.

The method embodiment provided by the embodiment 1 of the present application may be executed in a station, a computer terminal or other similar computing apparatuses. In an example in which the method embodiment is executed in an AP station in a WLAN, FIG. 1 is a block diagram of hardware of a station for a spatial reuse method according to an embodiment of the present disclosure. As shown in FIG. 1, a station 10 may include one or more (only one is shown in FIG. 1) processors 102 (the processors 102 may include, but are not limited to, a processing apparatus such as a microcontroller unit (MCU) and a field programmable gate array (FPGA)), a memory 104 used for storing data, and a transmission apparatus 106 used for a communication function. It should be understood by those skilled in the art that the structure shown in FIG. 1 is merely illustrative and not intended to limit the structure of the electronic apparatus described above. For example, the station 10 may further include more or less components than the components shown in FIG. 1, or has a configuration different from the configuration shown in FIG. 1.

The memory 104 may be used for storing software programs and modules of application software, such as program instructions/modules corresponding to the spatial reuse method in the embodiments of the present disclosure. The processor 102 executes the software programs and modules stored in the memory 104 so as to perform various functional applications and data processing, that is, to implement the method described above. The memory 104 may include a high-speed random access memory, and may further include a nonvolatile memory, such as one or more magnetic storage apparatuses, flash memories or other non-volatile solid-state memories. In some examples, the memory 104 may include memories which are remotely disposed with respect to the processor 102 and these remote memories may be connected to the station 10 via a network. Examples of the preceding network include, but are not limited to, the Internet, an intranet, a local area network, a mobile communication network and a combination thereof.

The transmission apparatus 106 is configured to receive or transmit data via a network. Exemplary examples of such a network may include a wireless network provided by a communication provider of the station 10. In one example, the transmission apparatus 106 includes a network interface controller (NIC), which may be connected to other network devices via a base station and thus be capable of communicating with the Internet. In one example, the transmission apparatus 106 may be a radio frequency (RF) module, which is configured to communicate with the Internet in a wireless way.

Figure 2:
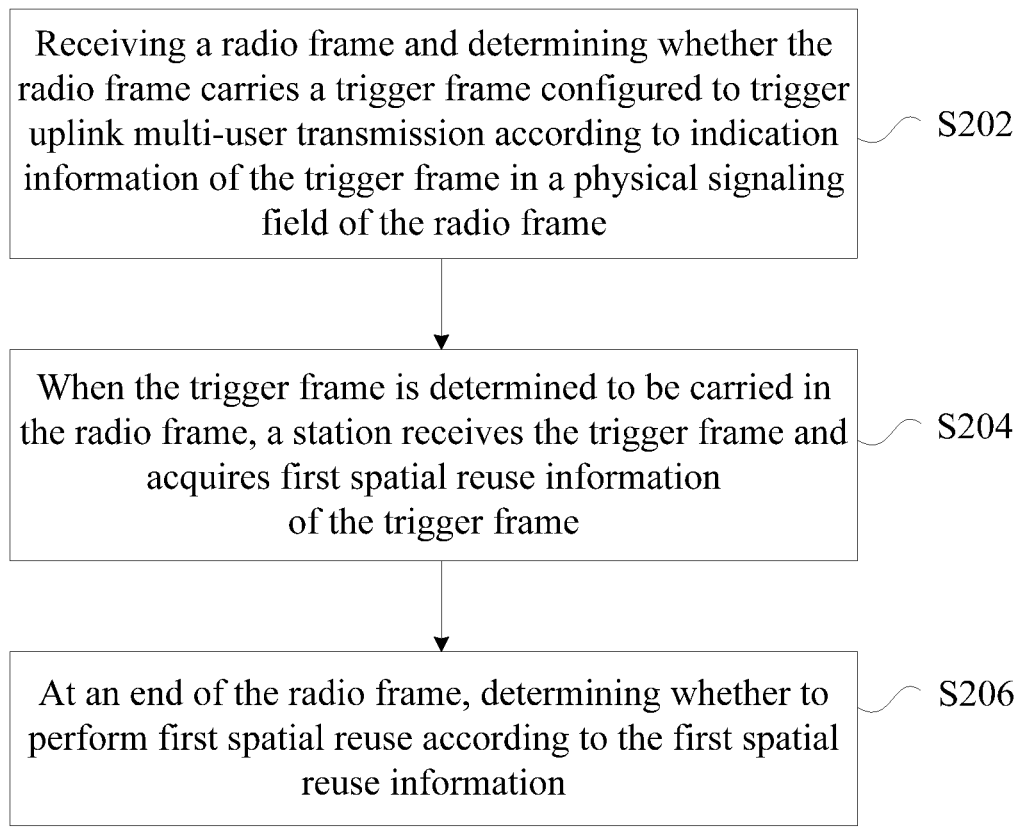
FIG. 2 is a flowchart illustrating a spatial reuse method according to an embodiment of the present disclosure.

This embodiment provides a spatial reuse method executed on the station described above. FIG. 2 is a flowchart illustrating a spatial reuse method according to an embodiment of the present disclosure. As shown in FIG. 2, the method includes steps described below.

In step S202, a radio frame is received and whether the radio frame carries a trigger frame configured to trigger uplink multi-user transmission is determined according to indication information of the trigger frame in a physical signaling field of the radio frame.

In step S204, upon determining that the trigger frame is carried in the radio frame, a station receives the trigger frame and acquires first spatial reuse information of the trigger frame.

In step S206, at an end of the radio frame, whether to perform first spatial reuse is determined according to the first spatial reuse information.

In the above steps, the radio frame is received and whether the radio frame carries the trigger frame configured to trigger the uplink multi-user transmission is determined according to the indication information of the trigger frame in the physical signaling field of the radio frame. In response to determining that the radio frame carries the trigger frame, the station receives the trigger frame and acquires the first spatial reuse information of the trigger frame. In the end of the radio frame (e.g., along a time-domain), whether to performed the first spatial reuse is determined according to the first spatial reuse information. Since spatial reuse on a subsequent radio frame can be determined or indicated by the trigger frame, the problem of low spatial reuse efficiency can be solved and a technical effect of improving network performance is achieved.

In some embodiments, the above steps may be executed by a station in a WLAN such as, but not limited to, an AP station or a non-AP station.

In some embodiments, the method further includes acquiring the indication information of the trigger frame according to second spatial reuse information in the physical signaling field of the radio frame. When the second spatial reuse information indicates that spatial reuse is delayed to the end of the radio frame, a detection result is determined to be that the radio frame carries the trigger frame. Alternatively, when the second spatial reuse information indicates that spatial reuse time is restricted before the end of the radio frame, the detection result is determined to be that the radio frame carries the trigger frame.

In some embodiments, before the first spatial reuse information is acquired, the method further includes identifying, according to basic service set identification information of the radio frame, that the radio frame belongs to an overlapping basic service set.

In some embodiments, before the first spatial reuse information is acquired, the method further includes that when a received signal strength indicator of the radio frame is greater than or equal to a signal detection threshold of the overlapping basic service set of the station, the station receives the trigger frame to obtain the first spatial reuse information.

In some embodiments, performing the first spatial reuse according to the first spatial reuse information at the end of the radio frame includes starting or resuming a back-off contention process at the end of the radio frame. In some embodiments, at an end of the back-off contention process, a frame exchange transmission process is started. A duration of the frame exchange transmission process is not greater than reservation time of the radio frame or a length of uplink radio frame transmission time indicated by the trigger frame. In some embodiments, at the end of the back-off contention process, the frame exchange transmission process is started. Transmission power TX_PWR of the station in the frame exchange transmission process is not greater than TX_PWR1, where TX_PWR1 is a difference obtained by subtracting a received signal strength indicator (RSSI) of the radio frame from a value SRP indicated by the first spatial reuse information.

In some embodiments, when it is determined that the radio frame carries no trigger frame, or the first spatial reuse information indicates that the spatial reuse is not allowed, the method further includes when a second spatial reuse condition is not satisfied, updating a local network allocation vector or the length of the uplink radio frame transmission time indicated by the trigger frame according to the reservation time of the radio frame at the end of the radio frame. In some embodiments, when the received signal strength indicator of the radio frame is greater than or equal to the signal detection threshold of the overlapping basic service set of the station, it is determined that the second spatial reuse condition is not satisfied. For example, when the reservation time of the radio frame is greater than the local network allocation vector, the local network allocation vector may be updated to the reservation time of the radio frame.

In some embodiments, the method further includes determining, according to the first spatial reuse information, whether a first spatial reuse condition is satisfied. If both the first spatial reuse condition and the second spatial reuse condition are satisfied, the method further includes ignoring an update of the local network allocation vector. If the first spatial reuse condition is satisfied and the second spatial reuse condition is not satisfied, the method further includes ignoring the update of the local network allocation vector. If both the first spatial reuse condition and the second spatial reuse condition are not satisfied, the method further includes updating the local network allocation vector.

In some embodiments, when the second spatial reuse information indicates that the spatial reuse is delayed to the end of the radio frame, the method further includes when the received signal strength indicator of the radio frame is less than the signal detection threshold of the overlapping basic service set of the station, determining that the second spatial reuse condition is satisfied and receiving the trigger frame to obtain the first spatial reuse information.

In some embodiments, performing the spatial reuse according to the first spatial reuse information at the end of the radio frame includes starting or resuming the back-off contention process at the end of the radio frame and starting the frame exchange transmission process at the end of the back-off contention process. The duration of the frame exchange transmission process is not greater than the reservation time of the radio frame; and transmission power TX_PWR in the frame exchange transmission process is not greater than a minimum value between TX_PWR1 and TX_PWR2. TX_PWR1 is the difference obtained by subtracting the received signal strength indicator (RSSI) of the radio frame from a value SRP indicated by the first spatial reuse information, and TX_PWR2 is maximum transmission power corresponding to the signal detection threshold of the overlapping basic service set of the station.

In some embodiments, when the second spatial reuse information indicates that the spatial reuse time is restricted to the end of the radio frame, the method further includes when the received signal strength indicator of the radio frame is less than the signal detection threshold of the overlapping basic service set of the station, determining that the second spatial reuse condition is satisfied. The method further includes stopping detecting the radio frame, and stopping receiving the trigger frame carried in the radio frame. The method further includes starting or resuming the back-off contention process, and starting the frame exchange transmission process at the end of the back-off contention process. The duration of the frame exchange transmission process is not greater than ending time of the radio frame, and the transmission power TX_PWR of the station in the frame exchange transmission process is not greater than TX_PWR2. TX_PWR2 is the maximum transmission power corresponding to the signal detection threshold of the overlapping basic service set of the station.

In some embodiments, the station starts or resumes the back-off competition process, and the method further includes starting or resuming the back-off competition process when channel detection of the station indicates that a channel is idle.

This embodiment further provides another spatial reuse method applied to a station at a transmitting end. The method includes transmitting a radio frame, where physical layer signaling of the radio frame includes indication information for indicating whether the radio frame is a trigger frame.

In some embodiments, the trigger frame is configured to trigger uplink transmission.

In some embodiments, manners for transmitting the radio frame includes transmitting the radio frame in a single user frame format, transmitting the radio frame in an extended range single user frame format, and transmitting the radio frame in a multi-user frame format.

In some embodiments, the indication information is carried in a signaling field in the physical layer signaling of the radio frame.

In some embodiments, the indication information is represented by a specific value of a spatial reuse parameter information field in the signaling field in the physical layer signaling of the radio frame. When the specific value indicates that spatial reuse is either delayed to the end of the radio frame or restricted to the end of the radio frame, the specific value can indicate that the radio frame is the trigger frame.

In some embodiments, the indication information is carried in a trigger frame indication field in the signaling field in the physical layer signaling of the radio frame. The value of trigger frame indication field is 1 or true, indicating that the radio frame carries the trigger frame; and the value of trigger frame indication field is 0 or false, indicating that no trigger frame is carried in the radio frame carries.

The trigger frame indication field occupies N bits, where N≥1.

From the description of the embodiments described above, the methods described above may be implemented by software executed by a hardware platform, or by any of a variety of hardware. Based on this principle, the solution provided by the present disclosure may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment 2

This embodiment further provides a spatial reuse apparatus. The apparatus is configured to implement the above-mentioned embodiments. What has been described will not be repeated. As used below, the term "module" may be software, hardware or a combination thereof capable of implementing predetermined functions. The apparatus in the embodiment described below is preferably implemented by software, but implementation by hardware or by a combination of software and hardware is also possible and conceived.

Figure 3:
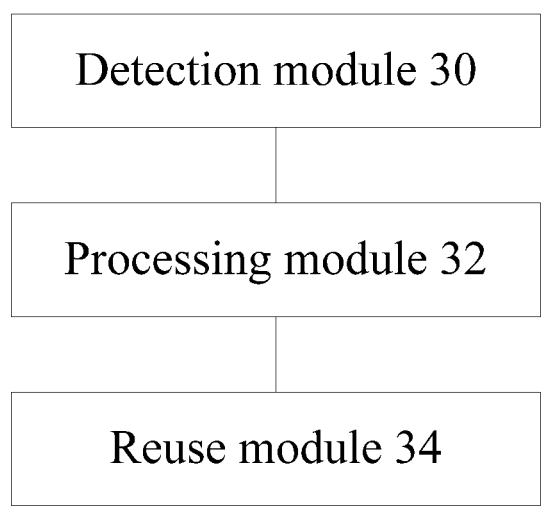
FIG. 3 is a block diagram of a spatial reuse apparatus according to an embodiment of the present disclosure.

FIG. 3 is a block diagram of a spatial reuse apparatus according to an embodiment of the present disclosure. The apparatus is applied to an AP station in a WLAN. As shown in FIG. 3, the apparatus includes a detection module 30, a processing module 32 and a reuse module 34.

The detection module 30 is configured to receive a radio frame and determine whether the radio frame carries a trigger frame configured to trigger uplink multi-user transmission according to indication information of the trigger frame in a physical signaling field of the radio frame.

The process module 32 is configured to enable the station to receive the trigger frame and acquire first spatial reuse information of the trigger frame when it is determined that the radio frame carries the trigger frame.

The reuse module 34 is configured to determine whether to perform first spatial reuse according to the first spatial reuse information at an end of the radio frame.

In some embodiments, the apparatus further includes an acquisition module. The acquisition module is configured to acquire the indication information of the trigger frame according to second spatial reuse information in the physical signaling field of the radio frame.

In some embodiments, the apparatus further includes a first determination module and a second determination module. The first determination module is configured to determine a detection result to be that the radio frame carries the trigger frame when the second spatial reuse information indicates that spatial reuse is delayed to the end of the radio frame. The second determination module is configured to determine the detection result to be that the radio frame carries the trigger frame when the second spatial reuse information indicates that spatial reuse time is restricted before the end of the radio frame.

In some embodiments, the reuse module further includes a first reuse unit. The first reuse unit is configured to start or resume a back-off contention process at the end of the radio frame.

This embodiment further provides another spatial reuse apparatus applied to an AP station in a WLAN. The apparatus includes a transmitting module configured to transmit a trigger frame of a radio frame. Physical layer signaling of the radio frame includes indication information for indicating whether the radio frame is the trigger frame.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment 3

This embodiment is an optional embodiment of the present disclosure, configured to describe the present application in detail in conjunction with exemplary examples.

A principle of an OBSS_PD based SR technology is to identify whether a PLCP protocol data unit (PPDU) is an OBSS PPDU or a BSS PPDU according to a BSS network identifier (BSS color or partial BSS color) or a partial BSS identifier (BSSID)/association identifier (AID) and a group identifier (GID) or BSSID carried in a physical frame header or a medium access control (MAC) frame of the PPDU when a station receives the PPDU. When the PPDU is the OBSS PPDU and a received signal strength indicator (RSSI) of the PPDU is lower than an OBSS detection threshold (OBSS_PD threshold), the station may stop receiving the PPDU without updating an NAV. The station may then start back-off contention for a channel and transmission power at this time is not greater than transmission power corresponding to the OBSS_PD threshold.

A high efficient (HE) trigger-based PPDU is configured for SRP_based SR. A principle of an SRP_based SR technology is to identify whether the HE trigger-based PPDU is the OBSS PPDU or the BSS PPDU according to the BSS color carried in the physical frame header of the HE trigger-based PPDU when the station receives the HE trigger-based PPDU. When it is identified that the HE trigger-based PPDU is the OBSS PPDU, the station calculates maximum transmission power for spatial reuse of the station according to a spatial reuse parameter (SRP) carried in a spatial reuse field in the physical frame header of the PPDU and the RSSI of the HE trigger-based PPDU (SRP-RSSI) and then the station may stop receiving the HE trigger-based PPDU without updating the NAV. The station starts the back-off contention for the channel, the transmission power at this time is not greater than the maximum transmission power for the spatial reuse, and a transmission duration is not greater than ending time of the HE trigger-based PPDU.

The SR in the related art has at least the following problem: if the station transmits a trigger frame in a HE format (HE PPDU), the station sets the spatial reuse field in a SIG-A in a HE preamble to SR_delay or SR_Restricted to delay the OBSS_PD based SR to an end of the HE PPDU and restrict completion of the OBSS_PD based SR before the end of the HE PPDU. When a reuse condition of the OBSS_PD based SR is satisfied, the station delays the OBSS_PD based SR and starts the OBSS_PD based SR after the end of the PPDU or restricts transmission time of the OBSS_PD based SR before the end of the PPDU. When the reuse condition is not satisfied, for example, when the RSSI of the OBSS PPDU is greater than the OBSS_PD threshold, the station determines whether to update the NAV at the end of the OBSS PPDU. Even if the station may satisfy the reuse condition of the OBSS HE trigger-based PPDU subsequently, the STA cannot perform the SRP_based SR since the NAV is set by the OBSS HE PPDU which previously carries the trigger frame.

In the solution in this embodiment, the station detects an OBSS radio frame; when the RSSI of the radio frame is greater than the OBSS_PD threshold of the station, that is, the reuse condition of the OBSS_PD based SR is not satisfied, the station reads the trigger frame carried in the OBSS radio frame and acquires spatial reuse information according to an indication of the spatial reuse information carried in the physical frame header, and performs the SRP_based SR.

Example 1

Figure 4:
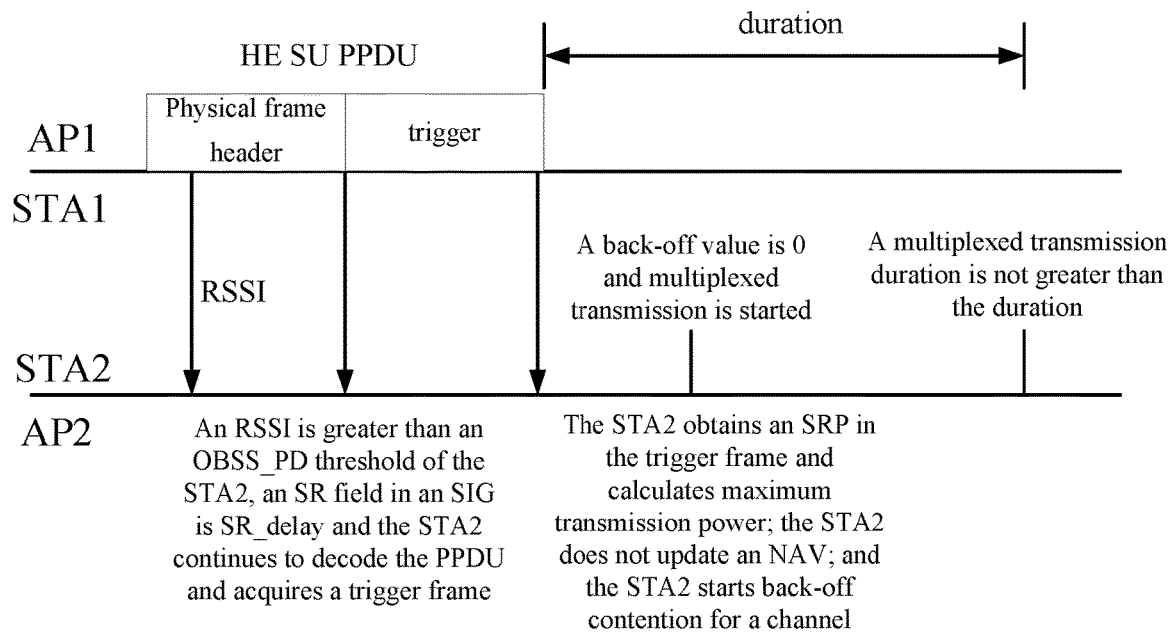
FIG. 4 is a schematic diagram illustrating a spatial reuse method for an OBSS PPDU in a HE SU format received by a station according to an embodiment of the present disclosure.

The example 1 describes a spatial reuse method for an OBSS PPDU in a HE single user (SU) format received by a station. FIG. 4 is a schematic diagram illustrating a spatial reuse method for an OBSS PPDU in a HE SU format received by a station according to an embodiment of the present disclosure.

Referring to FIG. 4, a WLAN network includes a BSS1 and a BSS2. The BSS1 includes an AP1 and a STA1, and the BSS2 includes an AP2 and a STA2. The AP1, the STA1, the AP2, and the STA2 are all HE stations and support SRP-based SR.

The AP1 transmits a HE SU PPDU carrying a trigger frame to the STA1. An SR field in a SIG-A field in a physical frame header, a HE preamble, of the PPDU is SR_delay.

When receiving the HE SU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is greater than the OBSS_PD threshold, the STA2 acquires a value of the SR field as SR_delay according to the SIG-A field (also called second spatial reuse information) in the physical frame header, the HE preamble, of the HE SU PPDU; the STA2 considers that the PPDU carries the trigger frame; then the STA2 continues to receive a payload of the PPDU, and acquires the trigger frame and the SR field in common Info. When the SR field is non-SR_Disallow and is not a reserved value, the STA2 calculates transmission power TX_PWRSRP by subtracting the RSSI from the value of the SR field. At the end of the PPDU, the STA2 does not update an NAV. If a channel detection result is that a channel is idle, the STA2 starts back-off contention for an SR transmission opportunity (TXOP). It is to be noted that a length of the SR TXOP cannot exceed a value of a duration field in the trigger, and transmission power cannot exceed TX_PWRSRP. When the SR field is SR_Disallow or the reserved value, the STA2 updates the NAV according to the value of the Duration field in the trigger at the end of the HE SU PPDU. The NAV is updated as the value of the Duration field when the value of the Duration field is greater than the NAV.

Example 2

A WLAN network includes a BSS1 and a BSS2. The BSS1 includes an AP1 and a STA1, and the BSS2 includes an AP2 and a STA2. The AP1, the STA1, the AP2, and the STA2 are all HE stations and support SRP-based SR.

The AP1 transmits a HE SU PPDU carrying a trigger frame to the STA1. An SR field in a SIG-A field in a physical frame header, a HE preamble, of the PPDU is SR_delay.

When receiving the HE SU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is less than the OBSS_PD threshold, the STA2 acquires the SR field as SR_delay according to the SIG-A field in the physical frame header, the HE preamble, of the PPDU; the STA2 continues to receive a payload of the PPDU, and acquires the trigger frame and the SR field in common Info. When the SR field is non-SR_Disallow, the STA2 calculates transmission power TX_PWRSRP by subtracting the RSSI from the value of the SR field. At the end of the PPDU, the STA2 does not update an NAV. The STA2 starts or resumes back-off contention for an SR TXOP. It is to be noted that a length of the SR TXOP cannot exceed a value of a duration field of the trigger. Assuming that transmission power corresponding to the OBSS_PD threshold of the STA2 is TX_PWROBSS_PD, transmission power TX_PWR of the STA2 in the SR TXOP is not greater than a minimum value between TX_PWROBSS_PD and TX_PWRSR.

Example 3

Figure 5:
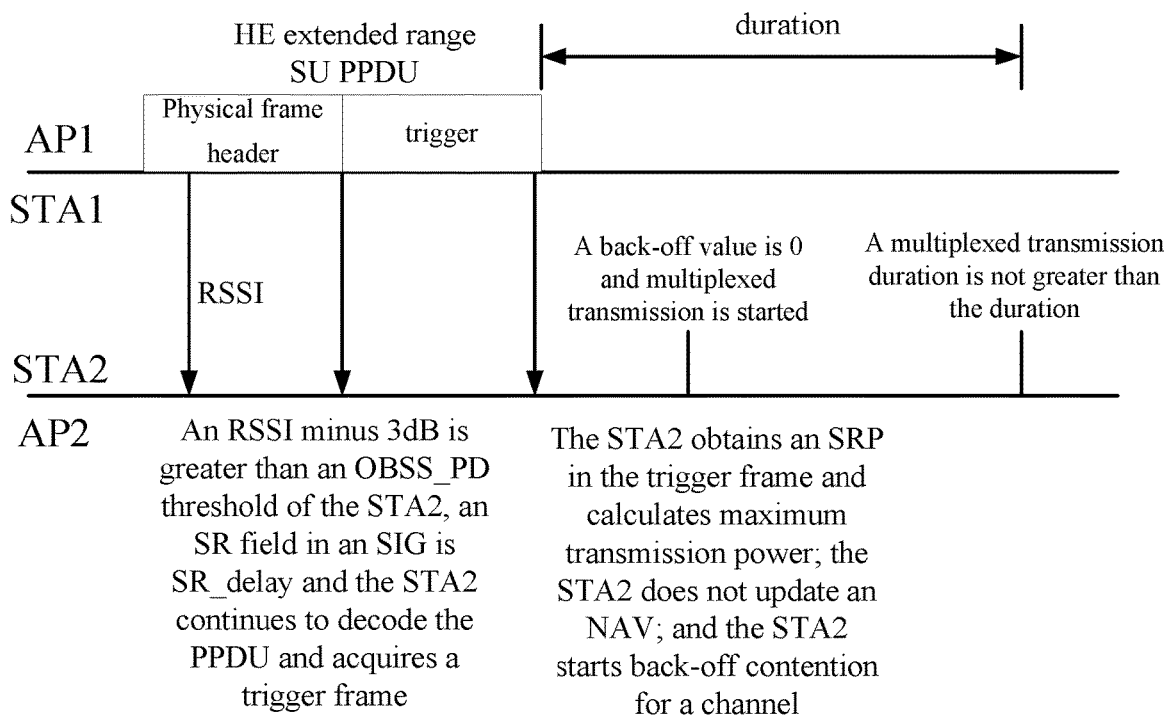
FIG. 5 is a schematic diagram illustrating a spatial reuse method for an OBSS PPDU in a HE extended range SU format received by a station according to an embodiment of the present disclosure.

The example 3 describes a spatial reuse method for an OBSS PPDU in a HE extended range SU format received by a station. FIG. 5 is a schematic diagram illustrating a spatial reuse method for an OBSS PPDU in a HE extended range SU format received by a station according to an embodiment of the present disclosure.

Referring to FIG. 5, a WLAN network includes a BSS1 and a BSS2. The BSS1 includes an AP1 and a STA1, and the BSS2 includes an AP2 and a STA2. The AP1, the STA1, the AP2, and the STA2 are all HE stations and support SRP-based SR.

The AP1 transmits a HE extended range SU PPDU carrying a trigger frame to the STA1. An SR field (also called second spatial reuse information) in a SIG-A field in a physical frame header, a HE preamble, of the PPDU is SR_delay.

When receiving the HE extended range SU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is greater than the OBSS_PD threshold, the STA2 acquires a value of the SR field as SR_delay according to the SIG-A field in the physical frame header, the HE preamble, of the PPDU; the STA2 considers that the PPDU carries the trigger frame; then the STA2 continues to receive a payload of the PPDU, and acquires the trigger frame and the SR field in common Info. When the SR field is non-SR_Disallow, the STA2 calculates transmission power TX_PWRSRP by subtracting the RSSI from the value of the SR field. At the end of the PPDU, the STA2 does not update an NAV. If a channel detection result is that a channel is idle, the STA2 starts back-off contention for an SR TXOP. It is to be noted that a length of the SR TXOP cannot exceed a value of a duration field in the trigger, and transmission power cannot exceed TX_PWRSRP, in some embodiments.

When the SR field is SR_Disallow or a reserved value, the STA2 updates the NAV according to the value of the Duration field in the trigger at the end of the HE extended range SU PPDU. The NAV is updated as the value of the Duration field when the value of the Duration field is greater than the NAV.

Example 4

A WLAN network includes a BSS1 and a BSS2. The BSS1 includes an AP1 and a STA1, and the BSS2 includes an AP2 and a STA2. The AP1, the STA1, the AP2, and the STA2 are all HE stations and support SRP-based SR.

The AP1 transmits a HE extended range SU PPDU carrying a trigger frame to the STA1. An SR field in a SIG-A field in a physical frame header, a HE preamble, of the PPDU is SR_delay.

When receiving the HE extended range SU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is less than the OBSS_PD threshold, the STA2 acquires the SR field as SR_delay according to the SIG-A field in the physical frame header, the HE preamble, of the PPDU; the STA2 continues to receive a payload of the PPDU, and acquires the trigger frame and the SR field in common Info. When the SR field is non-SR_Disallow, the STA2 calculates transmission power TX_PWRSRP by subtracting the RSSI from the value of the SR field. At the end of the PPDU, the STA2 does not update an NAV. The STA2 starts back-off contention for an SR TXOP. It is to be noted that a length of the SR TXOP cannot exceed a value of a duration field in the trigger. Assuming that transmission power corresponding to the OBSS_PD threshold of the STA2 is TX_PWROBSS_PD, transmission power TX_PWR of the STA2 in the SR TXOP is not greater than a minimum value between TX_PWROBSS_PD and TX_PWRSR.

Example 5

Figure 6:
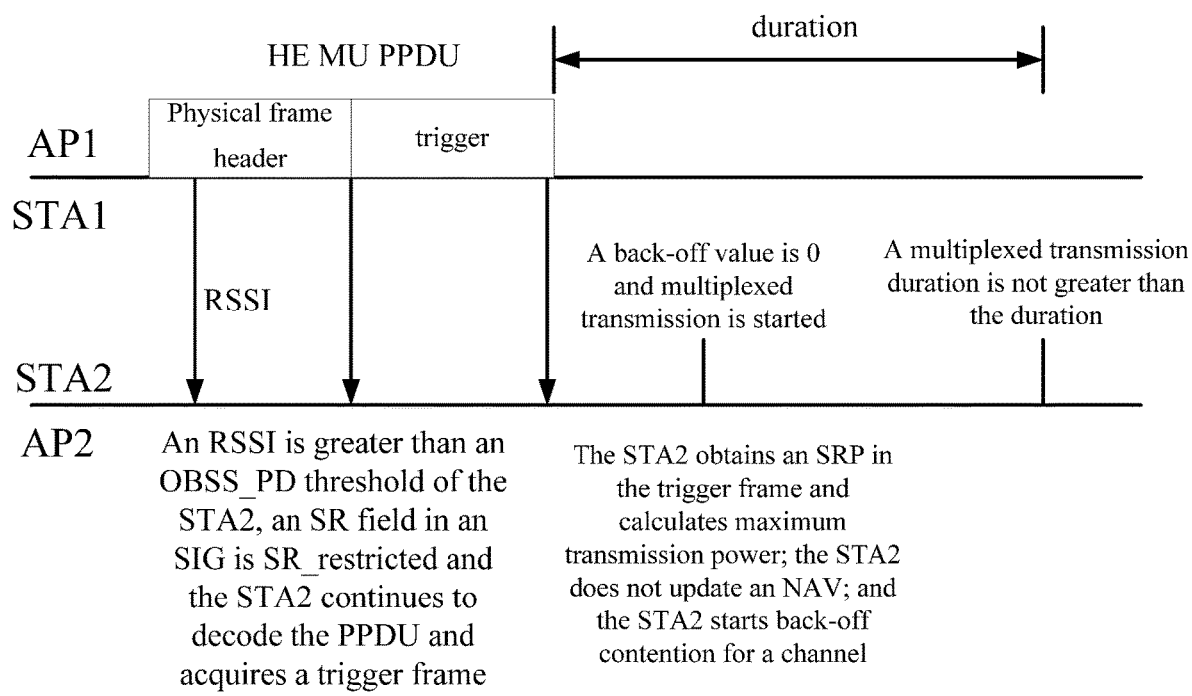
FIG. 6 is a schematic diagram illustrating a spatial reuse method for an OBSS PPDU in a HE MU format received by a station according to an embodiment of the present disclosure.

The example 5 describes a spatial reuse method for an OBSS PPDU in a HE MU format received by a station. FIG. 6 is a schematic diagram of a spatial reuse method for an OBSS PPDU in a HE multi-user (MU) format received by a station according to an embodiment of the present disclosure.

Referring to FIG. 6, a WLAN network includes a BSS1 and a BSS2. The BSS1 includes an AP1, a STA1a and a STA1b, and the BSS2 includes an AP2 and a STA2. The AP1, the STA1a, the STA1b, the AP2, and the STA2 are all HE stations and support SRP-based SR.

The AP1 transmits a HE MU PPDU carrying a trigger frame to the STA1a and the STA1b. An SR field (also called second spatial reuse information) in a SIG-A field in a physical frame header, a HE preamble, of the PPDU is SR_restricted.

When receiving the HE MU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is greater than the OBSS_PD threshold, the STA2 acquires a value of the SR field as SR_restricted according to the SIG-A field in the physical frame header, the HE preamble, of the PPDU; the STA2 considers that the PPDU carries the trigger frame; then the STA2 continues to receive a payload of the PPDU, and acquires the trigger frame and the SR field in common Info. When the SR field is non-SR_Disallow, the STA2 calculates transmission power TX_PWR by subtracting the RSSI from the value of the SR field. At the end of the PPDU, the STA2 does not update an NAV. If a channel detection result is that a channel is idle, the STA2 starts back-off contention for an SR TXOP. It is to be noted that a length of the SR TXOP cannot exceed a value of a duration field in the trigger.

When the SR field is SR_Disallow or a reserved value, the STA2 updates the NAV according to the value of the Duration field in the trigger at the end of the HE MU PPDU. The NAV is updated to the value of the Duration field when the value of the Duration field is greater than the NAV.

Example 6

A WLAN network includes a BSS1 and a BSS2. The BSS1 includes an AP1 and a STA1, and the BSS2 includes an AP2 and a STA2. The AP1, the STA1, the AP2, and the STA2 are all HE stations and support SRP-based SR.

The AP1 transmits a non-HT PPDU carrying a trigger frame to the STA1. The STA1 responds with an HE trigger-based PPDU after SIFs.

When receiving the non-HT PPDU transmitted by the AP1, the STA2 continues to decode and receive the trigger frame. The STA2 determines that the PPDU is an OBSS PPDU according to a TA field in the trigger, determines that the trigger frame is a basic trigger frame according to a subtype field in the trigger frame, and acquires spatial reuse information according to a spatial reuse information field in the trigger frame.

At an end of the non-HT PPDU, the STA 2 determines whether to perform a spatial reuse operation according to a comparison result of an RSSI of the non-HT PPDU and an OBSS_PD threshold, and the spatial reuse information.

(1) When the RSSI is less than the OBSS_PD threshold and the spatial reuse information is that spatial reuse is not allowed, the STA2 does not update an NAV according to a Duration in the trigger and the STA2 starts a back-off contention process; and transmission power is not greater than maximum transmission power corresponding to the OBSS_PD threshold.

(2) When the RSSI is less than the OBSS_PD threshold and the spatial reuse information is that the spatial reuse is allowed, the STA2 does not update the NAV according to the Duration in the trigger and the STA2 starts the back-off contention process; and transmission power TX_PWR≤min (TX_PWR2, TX_PWR1). TX_PWR2 is the maximum transmission power calculated according to the OBSS_PD threshold, and TX_PWR1 is maximum transmission power obtained by subtracting the RSSI from the spatial reuse information.

(3) When the RSSI is greater than the OBSS_PD threshold and the spatial reuse information is that the spatial reuse is allowed, the STA2 does not update the NAV according to the Duration in the trigger and the STA2 starts the back-off contention process; and transmission power TX_PWR≤TX_PWR1. TX_PWR1 is the maximum transmission power obtained by subtracting the RSSI from the spatial reuse information.

(4) When the RSSI is greater than the OBSS_PD threshold and the spatial reuse information is that the spatial reuse is not allowed, the STA2 updates the NAV according to the Duration in the trigger.

Example 7

A WLAN network includes a BSS1 and a BSS2. The BSS1 includes an AP1 and a STA1, and the BSS2 includes an AP2 and a STA2. The AP1, the STA1, the AP2, and the STA2 are all HE stations and support SRP-based SR.

The AP1 transmits a HE MU PPDU carrying a trigger frame to the STA1, and the AP1 sets an SR field in a physical signaling field, an SIG-A field, in a physical frame header, a HE preamble, of the PPDU as SR_restricted, to indicate that the PPDU carries the trigger frame.

Alternatively, the AP1 transmits a HE SU/extended range SU PPDU carrying the trigger frame to the STA1, and the AP1 sets the SR field in the physical signaling field, the SIG-A field, in the physical frame header, the HE preamble, of the PPDU as SR_relay, to indicate that the PPDU carries the trigger frame.

Alternatively, the AP1 transmits a PPDU carrying the trigger frame to the STA1, and the AP1 sets a trigger frame indication field in the physical signaling field in the physical frame header of the PPDU as 1 or true, to indicate that the PPDU carries the trigger frame. When the trigger frame indication field in the physical signaling field of the PPDU is 0 or false, it indicates that the trigger frame is not carried in the PPDU. The trigger frame indication field occupies N bits, where N≥1.

Example 8

This example describes a process of OBSS based SR. A HE SU PPDU is taken as an example, and the process is also applicable to a HE extend range SU PPDU.

A WLAN network includes a BSS1 and a BSS2. The BSS1 includes an AP1 and a STA1, and the BSS2 includes an AP2 and a STA2. The AP1, the STA1, the AP2, and the STA2 are all HE stations. The AP1 transmits a trigger frame in a HE SU PPDU format to the STA1. An SR field in a SIG-A field in a physical frame header, a HE preamble, of the PPDU is SR_delay.

When the STA2 receives the HE SU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is less than the OBSS_PD threshold, the STA2 determines the SR field as SR_delay according to the SIG-A field in the physical frame header, the HE preamble, of the PPDU; the STA2 continues to receive a payload of the PPDU. At the end of the PPDU, the STA2 does not update an NAV The STA2 starts back-off contention for an SR TXOP, and a length of the SR TXOP is not greater than a value of a TXOP duration field of the PPDU. Assuming that transmission power corresponding to the OBSS_PD threshold of the STA2 is TX_PWROBSS_PD, transmission power TX_PWR of the STA2 in the SR TXOP is not greater than TX_PWROBSS_PD.

In the example 7 and the example 8, when the STA2 compares its own OBSS_PD threshold with the RSSI of the PPDU, if the RSSI is greater than the OBSS_PD threshold, the STA2 cannot perform OBSS_PD based SR; the STA2 needs to continue to receive the PPDU and update a local NAV at the end of the PPDU as reservation time of the PPDU if the reservation time of the PPDU is greater than the local NAV.

Example 9

This example exemplarily described a process of OBSS based SR. A HE MU PPDU is taken as an example.

A WLAN network includes a BSS1 and a BSS2. The BSS1 includes an AP1 and a STA1, and the BSS2 includes an AP2 and a STA2. The AP1, the STA1, the AP2, and the STA2 are all HE stations.

The AP1 transmits a trigger frame in a HE MU PPDU format to the STA1. An SR field in a SIG-A field in a physical frame header, a HE preamble, of the PPDU is set as SR_restricted.

When receiving the HE MU PPDU, the STA2 determines that the PPDU is an inter-BSS PPDU according to a BSS color in the SIG-A field in the HE preamble. Meanwhile, the STA2 compares its own OBSS_PD threshold with an RSSI of the PPDU. When the RSSI is less than the OBSS_PD threshold, the STA2 determines the SR field as SR_restricted according to the SIG-A field in the physical frame header, the HE preamble, of the PPDU; the STA2 stops receiving the PPDU and considers that the PPDU is not received. The STA2 starts back-off contention for an SR TXOP, and a length of the SR TXOP is not greater than ending time of the PPDU, which may be calculated according to an L-SIG field of the PPDU. Assuming that transmission power corresponding to the OBSS_PD threshold of the STA2 is TX_PWROBSS_PD, transmission power TX_PWR of the STA2 in the SR TXOP is not greater than TX_PWROBSS_PD.

Example 10

This example describes a process of SRP-based SR. A HE trigger-based PPDU is taken as an example.

A WLAN network includes a BSS1 and a BSS2. The BSS1 includes an AP1 and a STA1, and the BSS2 includes an AP2 and a STA2. The AP1, the STA1, the AP2, and the STA2 are all HE stations and support the SRP-based SR.

The AP1 transmits a trigger frame in a HE SU PPDU format to the STA1. The STA1 transmits a response frame, the HE trigger-based PPDU.

When the STA2 receives the HE trigger-based PPDU, the STA2 determines that the PPDU is an inter-BSS PPDU according to a BSS color in a SIG-A field in a preamble. Meanwhile, the STA2 calculates maximum transmission power TX_PWRSRP by subtracting an RSSI of the PPDU from a value of an SR field, SRP, in the SIG-A field in a physical frame header, a HE preamble, of the PPDU, wherein the RSSI is power of the HE SU PPDU transmitted by the AP1 to the STA2. If the STA2 has not received the HE SU PPDU before, the RSSI may be replaced with lowest receiving sensitivity (for example, −82 dBm) of the STA2. The STA2 stops receiving the PPDU after the SIG-A is received and considers that the PPDU has not been received. The STA2 starts back-off contention for an SR TXOP, and a length of the SR TXOP is not greater than ending time of the PPDU, which may be calculated according to an L-SIG field of the PPDU. Transmission power TX_PWR of the STA2 in the SR TXOP is not greater than TX_PWRSRP.

In the solution in this embodiment, when the received OBSS PPDU does not satisfy the OBSS_PD based SR (also called second spatial reuse), the station performs the SRP-based SR (also called first spatial reuse) on the subsequent HE trigger-based PPDU according to the SR field (also called the first spatial reuse information) in the trigger frame in the OBSS PPDU, thereby improving network performance.

Embodiment 4

The embodiments of the present disclosure further provide a storage medium. In some embodiments, in this embodiment, the storage medium may be configured to store program codes for executing steps described below.

In S1, a radio frame is received and whether the radio frame carries a trigger frame configured to trigger uplink multi-user transmission is determined according to indication information of the trigger frame in a physical signaling field of the radio frame.

In S2, when it is determined that the radio frame carries the trigger frame, a station receives the trigger frame and acquires first spatial reuse information of the trigger frame.

In S3, at an end of the radio frame, whether to perform first spatial reuse is determined according to the first spatial reuse information.

In some embodiments, in this embodiment, the storage medium described above may include, but is not limited to, a USB flash disk, a read-only memory (ROM), a random access memory (RAM), a mobile hard disk, a magnetic disk, an optical disk or another medium capable of storing program codes.

In some embodiments, in this embodiment, a processor performs, according to program codes stored in a storage medium, the following step: a radio frame is received and whether the radio frame carries a trigger frame configured to trigger uplink multi-user transmission is determined according to indication information of the trigger frame in a physical signaling field of the radio frame.

In some embodiments, in this embodiment, the processor performs, according to the program codes stored in the storage medium, the following step: when it is determined that the radio frame carries the trigger frame, a station receives the trigger frame and acquires first spatial reuse information of the trigger frame.

In some embodiments, in this embodiment, the processor performs, according to the program codes stored in the storage medium, the following step: at an end of the radio frame, whether to perform first spatial reuse is determined according to the first spatial reuse information.

In some embodiments, for examples in this embodiment, reference may be made to the examples described in the embodiments and optional implementation modes described above, and the examples will not be repeated in this embodiment.

Apparently, it should be understood by those skilled in the art that each of the above-mentioned modules or steps of the present disclosure may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are exemplary embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

INDUSTRIAL APPLICABILITY

The spatial reuse method and apparatus in the present disclosure may solve the problem in the related art of low spatial reuse efficiency when a station performs spatial reuse on a radio frame and achieve a technical effect of improving network performance.

What is claimed is:
1. A method, comprising:
receiving, by a communication node in a wireless local network, a radio frame;
determining, by the communication node based on spatial reuse delay information included in indication information, whether the radio frame corresponds to a trigger frame, wherein a physical signaling field of the radio frame indicates the indication information, the spatial reuse delay information comprising a specific value indicating that spatial reuse is delayed to an end of the radio frame;
acquiring, by the communication node, first spatial reuse information from the trigger frame, wherein the trigger frame comprises the first spatial reuse information and an uplink radio frame transmission time;
determining, by the communication node, whether to perform spatial reuse according to the first spatial reuse information indicated by the trigger frame configured to trigger uplink multi-user transmission;
resuming, after delaying according to the specific value, by the communication node according to the determination of whether to perform spatial reuse, a back-off contention process at the end of the radio frame; and
starting, by the communication node, a frame exchange transmission process at an end of the back-off contention process, wherein a duration of the frame exchange transmission process is not greater than the uplink radio frame transmission time indicated by the trigger frame, wherein a transmission power in the frame exchange transmission process is not greater than a parameter, the parameter obtained by subtracting a received signal strength of the radio frame from a value spatial reuse parameter (SRP) indicated by the first spatial reuse information.

2. The method of claim 1, wherein the radio frame belongs to an overlapping basic service set.

3. The method of claim 1, further comprising:
ignoring, by the communication node based on the determination, updating of a local network allocation vector.

4. A communication node in a wireless local network, comprising:
a receiver configured to receive a radio frame; and
a processor, coupled to the receiver, and configured to:
determine, based on spatial reuse delay information included in indication information, whether the radio frame corresponds to a trigger frame, wherein a physical signaling field of the radio frame indicates the indication information, the spatial reuse delay information comprising a specific value indicating that spatial reuse is delayed to an end of the radio frame;
acquire first spatial reuse information from the trigger frame, wherein the trigger frame comprises the first spatial reuse information and an uplink radio frame transmission time;
determining whether to perform spatial reuse according to the first spatial reuse information indicated by the trigger frame configured to trigger uplink multi-user transmission;
resume, after delaying according to the specific value, according to the determination of whether to perform spatial reuse, a back-off contention process at the end of the radio frame; and
start a frame exchange transmission process at an end of the back-off contention process, wherein a duration of the frame exchange transmission process is not greater than the uplink radio frame transmission time indicated by the trigger frame, wherein a transmission power in the frame exchange transmission process is not greater than a parameter, the parameter obtained by subtracting a received signal strength of the radio frame from a value spatial reuse parameter (SRP) indicated by the first spatial reuse information.

5. The communication node of claim 4, wherein the radio frame belongs to an overlapping basic service set.

6. The communication node of claim 4, wherein the processor is further configured to:
ignore, based on the determination, updating of a local network allocation vector.

7. A method, comprising:
transmitting, by a communication node in a wireless local network, a radio frame, wherein the radio frame includes spatial reuse delay information included in indication information, wherein a physical signaling field of the radio frame indicates the indication information, wherein the spatial reuse delay information comprises a specific value indicating that spatial reuse is delayed to an end of the radio frame, wherein the spatial reuse delay information is configured to indicate whether the radio frame corresponds to a trigger frame, wherein the trigger frame comprises first spatial reuse information and an uplink radio frame transmission time, wherein the trigger frame is configured to trigger uplink multi-user transmission, wherein the first spatial reuse information indicated by the trigger frame is configured to indicate whether to perform spatial reuse before resuming, after delaying according to the specific value, a back-off contention process at the end of the radio frame and before starting a frame exchange transmission process at an end of the back-off contention process, wherein a duration of the frame exchange transmission process is not greater than the uplink radio frame transmission time indicated by the trigger frame, wherein a transmission power in the frame exchange transmission process is not greater than a parameter, the parameter obtained by subtracting a received signal strength of the radio frame from a value spatial reuse parameter (SRP) indicated by the first spatial reuse information.

8. The method of claim 7, further comprising:
transmitting, by the communication node, the radio frame in one of: a single user frame format, an extended range single user frame format, or a multi-user frame format.

9. A communication node in a wireless local network, comprising:
a transmitter configured to transmit a radio frame, wherein the radio frame includes spatial reuse delay information included in indication information, wherein a physical signaling field of the radio frame indicates the indication information, wherein the spatial reuse delay information comprises a specific value indicating that spatial reuse is delayed to an end of the radio frame, wherein the spatial reuse delay information is configured to indicate whether the radio frame corresponds to a trigger frame, wherein the trigger frame comprises first spatial reuse information and an uplink radio frame transmission time, wherein the trigger frame is configured to trigger uplink multi-user transmission, wherein the first spatial reuse information indicated by the trigger frame is configured to indicate whether to perform spatial reuse before resuming, after delaying according to the specific value, a back-off contention process at the end of the radio frame and before starting a frame exchange transmission process at an end of the back-off contention process, wherein a duration of the frame exchange transmission process is not greater than the uplink radio frame transmission time indicated by the trigger frame, wherein a transmission power in the frame exchange transmission process is not greater than a parameter, the parameter obtained by subtracting a received signal strength of the radio frame from a value spatial reuse parameter (SRP) indicated by the first spatial reuse information.

10. The communication node of claim 9, wherein the transmitter is further configured to transmit the radio frame in one of: a single user frame format, an extended range single user frame format, or a multi-user frame format.

* * * * *